United States Patent Office 3,484,664
Patented Dec. 16, 1969

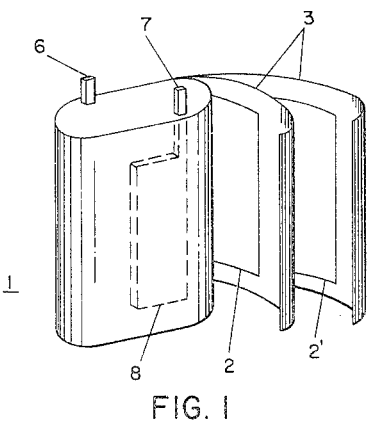
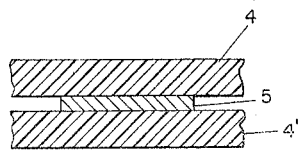
FIG. 1
FIG. 3
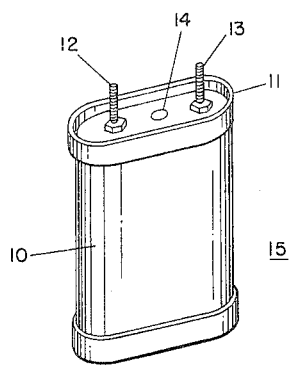
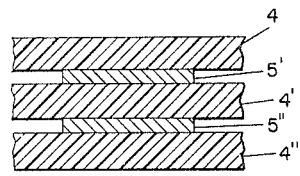
FIG. 2
FIG. 4
CHARLES A. LIDDICOAT
INVENTOR
BY William L. Peverill
ATTORNEY

3,484,664
ELECTRICAL CAPACITORS
Charles A. Liddicoat, Wilmington, Del., assignor to Hercules Incorporated, Wilmington, Del., a corporation of Delaware
Filed Nov. 21, 1968, Ser. No. 777,727
Int. Cl. H01g 1/00
U.S. Cl. 317—258                                7 Claims

ABSTRACT OF THE DISCLOSURE

Liquid impregnated electrical capacitors having high corona starting voltage and capacitance contain as the dielectric spacer, two (or more) sheets of thermoplastic film, each sheet being separated from the other sheets by a single, very thin stratum of a conductive metal, such as aluminum deposited one of the sheets.

---

The present invention relates to electrical capacitors and, more particularly, to fully impregnated electric capacitors having as the dielectric spacer a thermoplastic film.

Capacitor dielectric spacers have in the past been made of kraft paper or other cellulosic materials and more recently of synthetic resin films, either alone or in conjunction with kraft paper sheets. Synthetic resin films in general are superior to cellulosic sheet dielectrics in that they can withstand higher voltage stresses per unit of thickness, are less subject to flaws and defects, such as pin holes or conducting particles which reduce electrical strength, and have better power factor characteristics. In view of these and other properties, capacitors with synthetic resin film dielectrics can usually be made smaller than paper dielectric capacitors to obtain equivalent capacitance and voltage ratings. However, thin films of synthetic resins are subject to the drawback that they tend to stick and to adhere tightly to one another, and to the electrode foils with which they are wound in the manufacture of capacitors. The resultant sticking (commonly referred to as "blocking") of the synthetic resin film surfaces to adjacent surfaces of synthetic resin film or metal foil makes it difficult to impregnate such capacitors after winding. Moreover, the sticking tendencies cause the finally rolled capacitor unit to have air voids therein, and prevent ready flow of dielectric liquid to all portions of the roll. As a result, electrical strength is markedly reduced, corona starting voltage is lowered and the capacitor units are subject to premature breakdown and shortened operational life. Additionally, the non-porous nature of the synthetic resin films makes it difficult to impregnate them adequately. Poor impregnation results in unoccupied pores and voids in the interstices occurring between the films and adjacent non-porous surfaces with resultant deterioration and premature breakdown.

One method which has been proposed to improve impregnation of capacitors containing synthetic resin dielectrics is to use a porous material such as kraft paper in conjunction with the synthetic resin film. In these composite or layered dielectric capacitors, the porous layer, probably due to a wicking action, provides better and more uniform impregnation of the dielectric fluid. However, the use of a paper layer decreases the ability of the dielectric to withstand high voltage stresses per unit of thickness, and decreases the capacitance to volume ratio so that in general the beneficial results are offset to a commercially significant extent.

Another method which has been proposed to improve impregnation of synthetic resin films involves, including either on the film surface or throughout its mass, a particulate inorganic dielectric material such as aluminum oxide. However, the use of aluminum oxide, as a dusting on the film, is subject to the disadvantage that it is difficult to obtain and maintain a uniform distribution of the particles of the oxide on the film surface, and the incorporation of aluminum oxide into the resin prior to film formation is subject to the disadvantages that it is difficult to obtain uniform resinous dispersions and to extrude the resin under conditions such as to obtain a satisfactory film.

Now, in accordance with this invention it has been found that capacitors with synthetic resin film dielectrics can be uniformly impregnated with the dielectric fluid without the prior art disadvantages and additionally that the capacitors are more or less self-healing.

Accordingly, the present invention relates to an electrical capacitor comprising a pair of conductive electrodes separated by a dielectric spacer consisting essentially of at least two sheets of non-porous thermoplastic film, said sheets being in face to face relationship and having between adjacent faces a stratum of an electrically conductive material about $10^{-5}$ to $10^{-8}$ inch thick on one of said adjacent faces and covering an area which is at least coextensive with the area of the electrodes but less than the area of the face, and a dielectric fluid impregnating said spacer and filling any voids therein.

The thermoplastic material which forms the solid dielectric film of the capacitors of this invention can be any thermoplastic film-forming homopolymer or copolymer. Many such polymers are known, and include for example the polyolefins such as the polymers of ethylene or the higher mono-alpha-olefins containing 3 or more carbon atoms as well as copolymers thereof with a different olefin or a vinyl ester and the like; the polyesters such as poly(ethylene terephthalate); polystyrene and the vinyl polymers such as poly(vinyl chloride), poly(vinylidene chloride), vinylidene chloride-vinyl chloride copolymers, vinyl chloride-acrylonitrie copoymers, and the like; the polycarbonates; the polyamides; and the like. Particularly preferred because of the favorable mechanical and dielectric properties are the high molecular weight linear polymers of ethylene and the stereo-regular crystalline polymers of propylene, butene-1, pentene-1, 3-methylbutene-1 and 4-methylpentene-1.

Films of these polymers can be formed for purposes of this invention by rolling, extruding, pressing, solvent casting and melt casting. The films can also be stretched longitudinally and/or transversely to impart uniaxial, biaxial or balanced biaxial orientation to the film. Preferably, the film has a thickness of about 0.10 to 2.00 mils.

The dielectric spacer, as previously stated, consists essentially of at least 2 sheets of thermoplastic film and adjacent sheets of the film are separated from each other by a very thin coating or stratum of an electrically conductive material supported on one of the adjacent sheets. The electrically conductive material is preferably a metal and suitably, aluminum, zinc, silver, gold, tin, lead, cadmium, etc. The stratum or coating can be applied to the film face by a number of means including chemical decomposition, gas decomposition, sputtering, etc., but is preferably applied by vapor deposition in an atmosphere of reduced pressure (the so-called vacuum deposition technique). The exact thickness of the stratum or coating used will vary, of course, depending upon the particular conductive material.

A thickness within the range of about $10^{-5}$ to $10^{-8}$ inch and preferably about $10^{-6}$ to $10^{-7}$ inch has been found to be best suited for obtaining the advantages of the invention since such thicknesses provide good wetting of the film and hence, thorough liquid impregnation, maintain their integrity during normal capacitor construction, permit vaporization of the conductive material during any self-healing action without damage to the film, but are sufficiently thin so that there is no current carrying capacity.

The capacitors of the present invention are constructed in the usual manner except for the solid dielectric material employed. Thus, as is shown in the accompanying drawings, FIG. 1 is a perspective view of a partially uncoiled rolled capacitor assembly, FIG. 2 is a perspective view of a capacitor of the type of FIG. 1 after being encased in a container and FIGS. 3 and 4 are fragmentary cross-sectional views of typical dielectric spacers.

With reference to the drawings, the capacitor assembly 1 of FIG. 1 can be made by convolutely winding electrode strips 2 and 2' of metal foil such as aluminum, copper, tantalum, etc., with an interleaved dielectric spacer 3 comprising 2 sheets of non-porous thermoplastic film 4 and 4' separated by the stratum of metal 5 deposited on film 4' (see FIG. 3). In FIG. 4 of the drawing, the spacer comprises 3 sheets of thermoplastic film 4, 4' and 4" separated by metal strata 5' and 5". Although the sheet of film which carries the conductive material is not specifically shown by the drawings, it is understood that either one of the faces of the adjacent sheets may be the carrier, and that in the case when 2 or more sheets are employed, a single inner sheet thereof can be the carrier for 2 strata of the conductive material, i.e., a stratum on each face.

Electrical contact with the electrodes can be made by laid-in tap straps 6 and 7 having their ends protruding from one end of the rolled capacitor assembly. The tap straps can be welded to the electrodes, if desired, to obtain a better contact, and the lower part of the straps 6 and 7 can be enlarged as at 8 to provide a larger contact area with its cooperating electrode.

Prior to impregnating, the electrode-spacer assembly 1 is usually placed in a container such as the metal container 10 shown in FIG. 2, and the cover 11 hermetically sealed to the container.

Although not illustrated, the unit 15 shown in FIG. 2 further includes a dielectric liquid which occupies the remaining space in container 10 not occupied by the capacitor assembly and which also impregnates the dielectric spacer 3.

Before the cover is sealed on the container, the contact tap straps 6 and 7 are respectively affixed to the terminals 12 and 13 extending through and insulated from the cover. In order to allow withdrawal of moisture and air from the assembly and the introduction of the impregnating liquid, a small hole 14 is provided in the cover 11.

Before impregnation, the capacitor assemblies are normally vacuum dried to remove residual moisture. The drying temperature will vary depending on the length of the drying cycle, but usually ranges from about 60 to about 150° C. with too low a temperature, the drying period is excesively long while too high a temperature causes decomposition and shrinkage of the dielectric spacer.

The impregnating dielectric liquid is admitted to the capacitor assembly through hole 14 preferably while the dried assembly is still under vacuum in a suitable evacuated enclosure. Usually, sufficient impregnating liquid is introduced to at least submerge the capacitor element in the container. The pressure in the enclosure is then raised to atmospheric pressure or greater and the assembly permitted to stand for a number of hours for thorough penetration of the liquid impregnation. After impregnation, the capacitor unit is sealed, as by applying a suitable quantity of solder to hold 14. In addition to the foregoing processes, other techniques which generally utilize heat and/or pressure, can be utilized to aid in the impregnating process.

Certain well known fluid impregnating liquids can be employed in the present invention. Examples of suitable impregnants are mineral oil, castor oil, cottonseed oil, silicone oil, polybutene and any of the various halogenated aromatic hydrocarbon compounds. Examples of the halogenated aromatic compounds are the chlorinated diphenyls, the chlorinated diphenyl ketones, pentachloronitrodiphenyl and its alkyl derivatives, chlorinated benzene and benzene derivatives and the like.

By way of example, a group of capacitors similar in construction to sections of power factor correction capacitors was made, each containing a wound pair of aluminum electrode foils 0.25 mil thick separated by two sheets of 0.5 mil thick heat set, biaxially oriented polypropylene film, one sheet of which was coated with a layer of aluminum, approximately $10^{-6}$ inch thick on the surface adjacent to the other sheet. The aluminum coating was vacuum deposited on the film by transporting the film across a heated aluminum vapor source. The source was properly masked so that the marginal edges of the film were free of coating, and the coating width was 80% of the width of the film. The transport was accomplished by means of a powered winding mechanism comprising two spool holders, associated supports and jockey rollers. The coating was applied while the entire vapor source, mask and transport mechanism were enclosed in a chamber evacuated to $10^{-5}$ torr pressure at ambient temperature. A control group of capacitors was made of identical construction except that the polypropylene film was not coated. Both groups were impregnated with chlorinated diphenyl dielectric liquid (Aroclor 1242) under the same conditions. The average corona starting voltage of the control group of capacitors was much lower than that of the group made with the aluminum coated polypropylene film. These tests indicate that coating the surface of the film in accordance with the invention improves the impregnability of thermoplastic dielectric films as evidenced by the higher corona starting voltages.

A second control group of capacitors of the same size was also constructed in the manner of the example except that a paper-polypropylene film composite composed of two sheets of polyproylene film 0.5 mil thick separated by a single sheet of kraft paper 0.5 mil thick was substituted for the two sheets of polypropylene film separated by the aluminum coating. Tests conducted thereon showed that the capacitors of the example had a higher capacitance per unit of size at essentially equivalent starting voltages than the control capacitors containing the paper-polypropylene film composite.

Tests conducted on a number of liquid impregnated capacitors constructed as in the example except that films of linear polyethylene and poly(ethylene terephthalate) were substituted for the polypropylene film demonstrated that in all cases the life of the capacitor containing the dielectric spacer of the invention was considerably longer than the life of the capacitor controls containing two sheets of film, neither of which was coated.

What I claim and desire to protect by Letters Patent is:

1. An electrical capacitor comprising a pair of conductive electrodes separated by a dielectric spacer consisting essentially of at least two sheets of non-porous thermoplastic film, said sheets being in face to face relationship and having between adjacent faces a stratum of an electrically conductive material about $10^{-5}$ to $10^{-8}$ inch thick on one of said adjacent faces and covering an area which is at least coextensive with the area of the electrodes but less than the area of the face, and a dielectric fluid impregnating said spacer and filling any voids therein.

2. The capacitor of claim 1 wherein the conductive material is vacuum deposited on the thermoplastic film.

3. The capacitor of claim 2 wherein the conductive material is a metal.

4. The capacitor of claim 3 wherein the metal is aluminum.

5. The capacitor of claim 4 wherein the thermoplastic is a polyolefin.

6. The capacitor of claim 5 wherein the polyolefin is polypropylene.

7. The capacitor of claim 6 wherein the film is biaxially oriented.

References Cited

UNITED STATES PATENTS 3,340,446   9/1967   Cox _____ 174—25 X

E. A. GOLDBERG, Primary Examiner

U.S. Cl. X.R.

174—25; 317—260, 261